Patented July 9, 1940

2,207,069

UNITED STATES PATENT OFFICE 2,207,069

COFFEE BEAN MOLDING COMPOUND AND PROCESS

Herbert S. Polin, New York, N. Y.

No Drawing. Application August 5, 1939, Serial No. 288,496

8 Claims. (Cl. 106—1)

My invention relates to a process for the treatment of the bean of the genus Coffea, or the like, for the production of a material in the form of a powder capable of being molded under heat and pressure. The plastic material so formed has the properties of an artificial thermo-setting resin and filler. The use of the green coffee bean for this purpose is new and novel, and is prompted by the availability in large quantities and at low cost of that percentage of the world's production of coffee in excess of the world's consumption of coffee as a beverage.

The invention hereinafter described comprises the novel product, as well as the method by which the product is arrived at.

The chemistry of coffee, like that of all natural products, is very complex, and most analyses are of the proximate type. The analyses vary somewhat for different specimens. More or less typical figures are as follows:

Unroasted coffee

| | |
|---|---|
| Caffein | 1-3% |
| H₂O | 7-11% |
| Sugars | 4-9% |
| Fatty oils | 12-13.5% |
| Water-soluble material | 25-30% |
| Nitrogen-free extract | 18% ca. |
| Raw fiber | 25-30% |
| Protein | 10-13% |
| Tannins | 6-11% |
| Ash | 4% ca. |

The protein consists largely of albumins and legumins. The oil has been analyzed as containing:

| | Per cent |
|---|---|
| Palmitic acid | 29 |
| Daturic acid | 3 |
| Carnaubic acid | 14 |
| Oleic acid | 2 |
| Linoleic acid | 50 |

The chemistry of the coffee bean from all districts is essentially the same, showing variation only in the relative percentages of the materials composing it.

The process of conversion that I have devised takes the following steps:

1. The green bean is ground to a powder.
2. The oil is removed, preferably by solvent extraction.
3. The coffee residue is ground to a state of a flour.
4. The extracted oil is fractionated to separate the components.
5. The linoleic and oleic compounds, and any tannins, proteins, or water-soluble materials that have come over in the solvent during extraction, are remixed with the extracted coffee flour, in combination with an equal quantity (by weight) of water, placed in a sealed reaction vessel, and the temperature raised to approximately 300° F., preferably under agitation.
6. The temperature is maintained until a pressure of approximately 350 pounds is indicated within the chamber.
7. The resulting material is water-washed and dried.

The material thus obtained is a coordinate type of resin, the product of the reaction of the extracted and reintroduced chemical constituents of the coffee, with particularly the tannins, aldehydes, hydroxy compounds, and the various complex nitrogenous entities.

Although the process is self-catalytic, the reaction may be stimulated by the addition of a small percentage of mineral acid to the mixture placed in the reaction vessel. This may consist of 2% by weight of sulfuric acid added with the water to the extracted material.

The resulting powder, dark brown in color, is immediately ready for molding, and it is in the final state of pressure and temperature in the mold that it achieves the polymerization of completion.

It is emphasized that the product obtained is unique in that it is a plastic composed of a binder and filler originating from the same natural source, and in a form of homogeneity prior to conversion to the new state. The green coffee bean is of tough cellular fiber structure, and this quality is transmitted to the finished plastic product.

The molding powder begins to flow at approximately 315° F., but is preferably molded at approximately 350° F., and at pressures ranging from 2,500 to 5,000 pounds per square inch. It may be extrusion-molded at 340° F.

While the material is normally self-lubricating, it is compatible with most plasticizers, resins, and synthetic resins, and may be admixed with them if conditions should require some physical characteristics not found in the coffee plastic alone.

The resultant material is water- and alkali-resistant, resistant to weak acids, ketones, etc.

Having thus described my invention, what I claim for Letters Patent is:

1. A method for the preparation of a molding material which consists in reacting essentially those chemical compounds found in the bean of the genus Coffea after removal of the carnaubic, palmitic and daturic acid in the presence of water under high temperature and pressure.

2. A method for the preparation of a molding material consisting in removing the oil from the green coffee bean, fractionating the oil, reintroducing the oleic and linoleic fractions of the extracted oil into the extracted coffee, and reacting the material under heat and pressure.

3. A method for the preparation of a molding material consisting in removing the oil from the green coffee bean, fractionating the oil, reintroducing the oleic and linoleic fractions of the extracted oil into the extracted coffee, and reacting the material under heat and pressure in the presence of an extraneous catalyst.

4. A method for the preparation of a molding material consisting in removing the oil from the green coffee bean, fractionating the oil, reintroducing the oleic and linoleic fractions of the extracted oil into the extracted coffee, and reacting the material under heat and pressure in the presence of a mineral acid.

5. A method for the preparation of a molding material consisting in removing the oil from the green coffee bean, fractionating the oil, reintroducing the oleic and linoleic fractions of the extracted oil into the extracted coffee, and reacting the material under heat and pressure in the presence of sulfuric acid.

6. A plastic composed of the reacted products of the bean of the genus Coffea, after removal of the palmitic, carnaubic and daturic acids, some of which products constitute a filler, and some a binder.

7. The process of obtaining a plastic which consists in grinding green coffee beans, effecting extraction of the oils therefrom, and recombining with said flour the linoleic and oleic compounds, tannins, proteins, and water-soluble materials obtained by said extraction, in the presence of water, at a predetermined temperature and pressure.

8. The product resulting from the process of claim 7.

HERBERT S. POLIN.